United States Patent
Choi

(10) Patent No.: US 9,494,682 B2
(45) Date of Patent: Nov. 15, 2016

(54) RADAR WEATHER DATA SIGNAL PROCESSING METHOD AND SIGNAL PROCESSING MODULE

(71) Applicant: WEATHERLINK CO., LTD, Seongnam-si, Gyeonggi-do (KR)

(72) Inventor: Jeongho Choi, Uijeongbu-si (KR)

(73) Assignee: WEATHERLINK CO., LTD, Seongnam-si, Gyeonggi-do (KR)

( * ) Notice: Subject to any disclaimer, the term of this patent is extended or adjusted under 35 U.S.C. 154(b) by 66 days.

(21) Appl. No.: 14/411,562

(22) PCT Filed: Apr. 8, 2014

(86) PCT No.: PCT/KR2014/003025
§ 371 (c)(1),
(2) Date: Dec. 29, 2014

(87) PCT Pub. No.: WO2014/171659
PCT Pub. Date: Oct. 23, 2014

(65) Prior Publication Data
US 2015/0145718 A1 May 28, 2015

(30) Foreign Application Priority Data
Apr. 18, 2013 (KR) .................. 10-2013-0043043

(51) Int. Cl.
*G01S 13/95* (2006.01)
*G01S 7/285* (2006.01)
*G01S 13/28* (2006.01)

(52) U.S. Cl.
CPC .............. *G01S 13/95* (2013.01); *G01S 7/285* (2013.01); *G01S 13/282* (2013.01)

(58) Field of Classification Search
CPC ........ G01S 13/95; G01S 13/282; G01S 7/285
USPC ..... 342/26 R, 26 A–26 D, 188–189, 194–196
See application file for complete search history.

(56) References Cited

U.S. PATENT DOCUMENTS

| 4,580,139 A * | 4/1986 | Weathers ............... G01S 13/284 342/136 |
| 5,331,328 A * | 7/1994 | Pender ................... G01S 13/288 342/145 |

(Continued)

FOREIGN PATENT DOCUMENTS

| JP | 2011-027546 A | 2/2011 |
| KR | 10-2012-0125900 A | 11/2012 |

(Continued)

OTHER PUBLICATIONS

International Search Report for PCT/KR2014/003025 mailed Jun. 27, 2014 from Korean Intellectual Property Office.

(Continued)

*Primary Examiner* — John B Sotomayor
(74) *Attorney, Agent, or Firm* — Paratus Law Group, PLLC

(57) ABSTRACT

Disclosed is a radar weather data signal processing module comprising: a pulse compression unit for pulse-compressing a received weather signal; a correlation coefficient calculation unit for calculating a correlation coefficient on the basis of the pulse-compressed weather signal; and a weather variable calculation unit for calculating a weather variable on the basis of the calculated correlation coefficient.

8 Claims, 14 Drawing Sheets

(56) References Cited

U.S. PATENT DOCUMENTS

| | | | |
|---|---|---|---|
| 6,061,013 A | 5/2000 | Sauvageot et al. | |
| 8,354,950 B2* | 1/2013 | Kemkemian | 342/175 |
| 2010/0188283 A1* | 7/2010 | Kemkemian | G01S 13/953 342/26 B |
| 2014/0253370 A1* | 9/2014 | Mizutani | G01S 13/95 342/26 R |
| 2015/0145718 A1* | 5/2015 | Choi | G01S 7/285 342/26 R |
| 2015/0160374 A1* | 6/2015 | Choi | G06F 17/156 702/3 |

FOREIGN PATENT DOCUMENTS

| | | | | |
|---|---|---|---|---|
| WO | WO 2014171659 A1 | * | 10/2014 | G01S 7/285 |
| WO | WO 2014171660 A1 | * | 10/2014 | G06F 17/156 |

OTHER PUBLICATIONS

Lee, Hun et al., "Development of Ka-band pulse compression radar for meteorological observation", The eleventh Weather Radar Workshop, Oct. 22, 2010, See p. 5.

* cited by examiner

RADAR WEATHER DATA SIGNAL PROCESSING METHOD AND SIGNAL PROCESSING MODULE

CROSS REFERENCE TO PRIOR APPLICATIONS

This application is a National Stage Patent Application of PCT International Patent Application No. PCT/KR2014/003025 (filed on Apr. 8, 2014) under 35 U.S.C. §371, which claims priority to Korean Patent Application No. 10-2013-0043043 (filed on Apr. 18, 2013), which are all hereby incorporated by reference in their entirety.

TECHNICAL FIELD

The present invention relates to a radar weather data signal processing method and signal processing module, and more particularly, to a radar weather data signal processing method and signal processing module, whereby a weather variable is calculated from a weather signal.

BACKGROUND ART

A weather observation apparatus receives weather observation data from a weather radar or an antenna, properly signal-processes the received data, thereby displaying real time observation data or generating a weather product.

In order to precisely check or forecast weather, a capability for properly processing weather data is required. However, when a current signal processing technology is used, a burden occurs due to a high required amount of calculation, and resolution is lowered.

DETAILED DESCRIPTION OF THE INVENTION

Technical Problem

The present invention provides a radar weather data signal processing method and signal processing module, whereby pulse compression processing is used to implement high resolution.

Technical Solution

According to an aspect of the present invention, there is provided a radar weather data signal processing module including: a pulse compression unit that pulse-compresses a received weather signal; a correlation coefficient calculation unit that calculates a correlation coefficient based on the pulse-compressed weather signal; and a weather variable calculation unit that calculates a weather variable based on the calculated correlation coefficient.

The pulse compression unit may include: a format conversion unit that converts a horizontal polarized wave in-phase/quadrature-phase (I/Q) signal and a vertical polarized wave I/Q signal that are received weather signals, into a format of floating decimal point data; a linear frequency modulation (LFM) signal-applying unit that applies a reference LFM signal; a window application unit that applies window functions to the horizontal polarized wave I/Q signal and the vertical polarized wave I/Q signal that are converted by the format conversion unit and the reference LFM signal; a fast fourier transform (FFT) performance unit that performs FFT on the signals to which the window functions are applied; a convolution unit that performs convolution on the signals on which FFT is performed by the FFT performance unit; and an inverse FFT (IFFT) performance unit that generates a compressed horizontal polarized wave I/Q signal and a compressed vertical polarized wave I/Q signal by performing IFFT on the convoluted signals.

The correlation coefficient calculation unit may include: a mode selection unit that selects a time domain mode or a frequency domain mode; a time domain mode unit that calculates a single polarized wave correlation coefficient and a cross-polarized wave correlation coefficient by performing time domain clutter filtering on the compressed I/Q signal; and a frequency domain mode unit that calculates a single polarized wave correlation coefficient by performing frequency domain clutter filtering on the compressed I/Q signal.

The weather variable calculation unit may include: a threshold variable calculation unit that calculates a threshold variable based on the calculated correlation coefficient; a weather variable calculation unit that calculates a weather variable based on the calculated correlation coefficient; a threshold processing unit that removes a weather variable less than a threshold value and causes a weather variable that exceeds the threshold value to pass, based on the threshold variable and the weather variable; and a speckle removing unit that removes speckles from the weather variable that is threshold-processed by the threshold processing unit.

The weather variable calculation unit may further include a distance averaging unit that averages a distance of the calculated correlation coefficient.

According to another aspect of the present invention, there is provided a radar weather data signal processing method, whereby a weather signal is processed by a radar weather data signal processing module, the radar weather data signal processing method including: pulse-compressing a received weather signal using the radar weather data signal processing module; calculating a correlation coefficient based on the pulse-compressed weather signal using the radar weather data signal processing module; and calculating a weather variable based on the calculated correlation coefficient using the radar weather data signal processing module.

Effects of the Invention

According to the present invention, a pulse compression processing operation is adopted in a weather signal processing operation so that high resolution can be implemented, and a window function is applied to pulse compression so that a problem of the occurrence of side lobes can be solved.

MODE OF THE INVENTION

An exemplary embodiment of the present invention will be described in detail with reference to the attached drawings.

Figure 1:
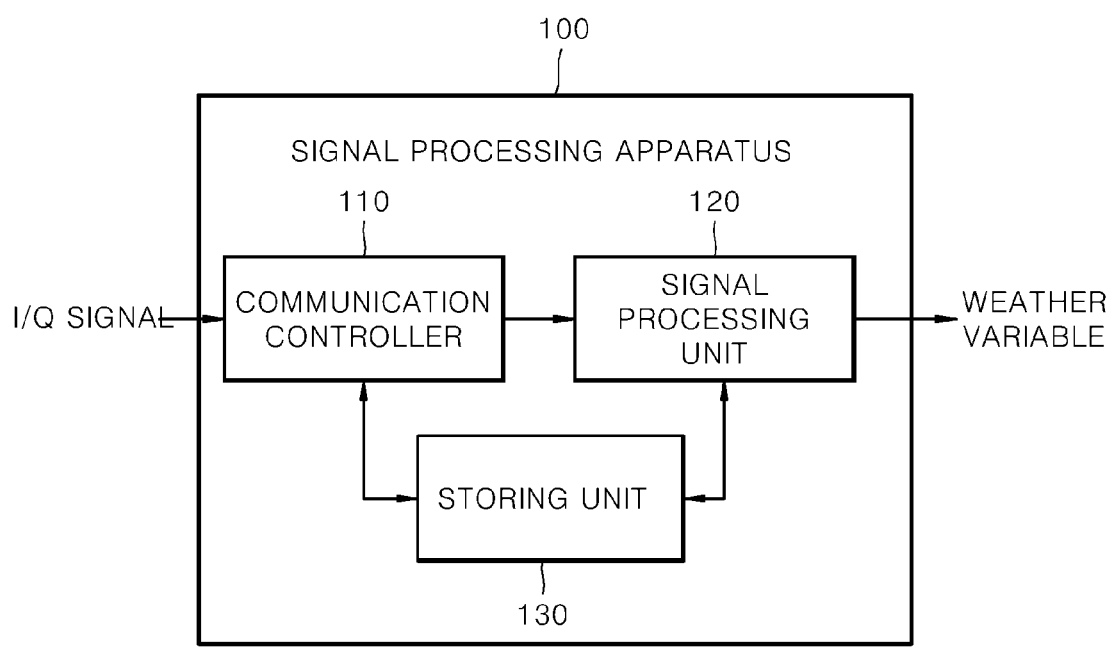
FIG. 1 is a block diagram of a signal processing module according to an embodiment of the present invention.

FIG. 1 is a block diagram of a signal processing module according to an embodiment of the present invention.

Referring to FIG. 1, a signal processing module (hereinafter, referred to as a 'signal processing apparatus 100') includes a communication controller 110, a signal processing unit 120, and a storing unit 130. The communication controller 110 receives a horizontal polarized wave in-phase/quadrature-phase (I/Q) signal and a vertical polarized wave I/Q signal from a transmission/receiving unit (not shown) as light and transfers the received horizontal polarized wave I/Q signal and the received vertical polarized wave I/Q signal to the signal processing unit 120 through a peripheral component interconnect (PCI). The communication controller 110 includes an optical communication function based on a field programmable gate array (FPGA). The signal processing unit 120 generates a weather variable based on the horizontal polarized wave I/Q signal and the vertical polarized wave I/Q signal that are received from the communication controller 110 and transmits the generated weather variable to an operation control unit (not shown). The signal processing unit 120 will be described in detail below. The storing unit 130 stores temporary data that is processed by the signal processing unit 120. The storing unit 130 may be implemented with a solid-state drive (SSD). Also, the storing unit 130 is an element that may be omitted in consideration of a burden of a load.

Figure 2:
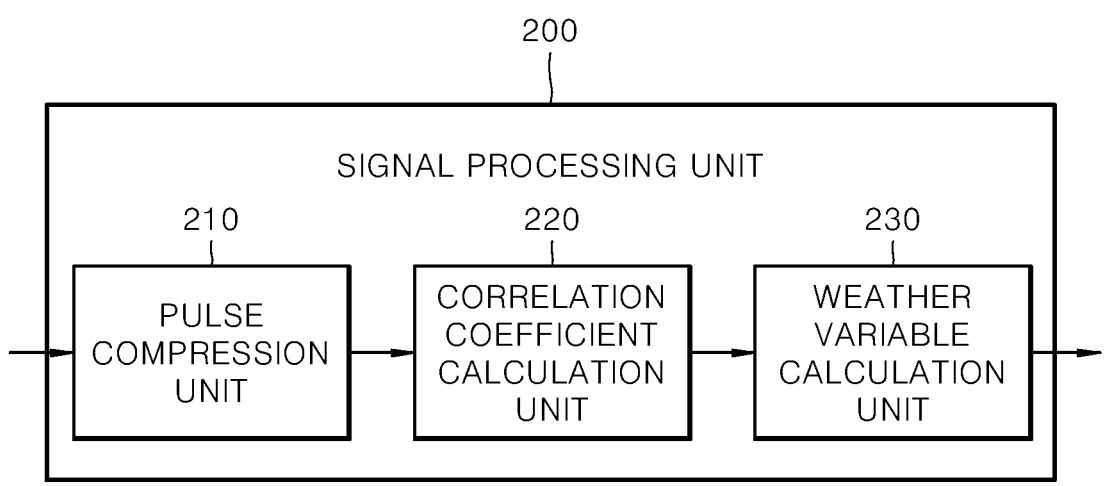
FIG. 2 is a block diagram of a signal processing unit of FIG. 1 according to an embodiment of the present invention.

FIG. 2 is a block diagram of a signal processing unit of FIG. 1 according to an embodiment of the present invention.

Referring to FIG. 2, a signal processing unit 200 includes a pulse compression unit 210 that receives a horizontal/vertical (H/V) polarized wave I/Q signal including fixed decimal point data of 20 bits from a communication controller through a PCI and converts the received H/V polarized wave I/Q signal into the format of a floating decimal point and pulse-compresses the converted H/V polarized wave I/Q signal, a correlation coefficient calculation unit 220 that calculates a correlation coefficient from the compressed H/V polarized wave I/Q signal, and a weather variable calculation unit 230 that calculates a weather variable from the correlation coefficient. The signal processing unit 200 outputs the calculated weather variable to the operation control unit (not shown). Although not shown, the signal processing unit 200 may further include a communication unit, such as a PCI that may communicate with the communication controller in the signal processing apparatus, and a communication unit, such as Ethernet that may communicate with the operation control unit or a display analysis unit. Elements of the signal processing unit 200 will be described in detail below.

Figure 3:
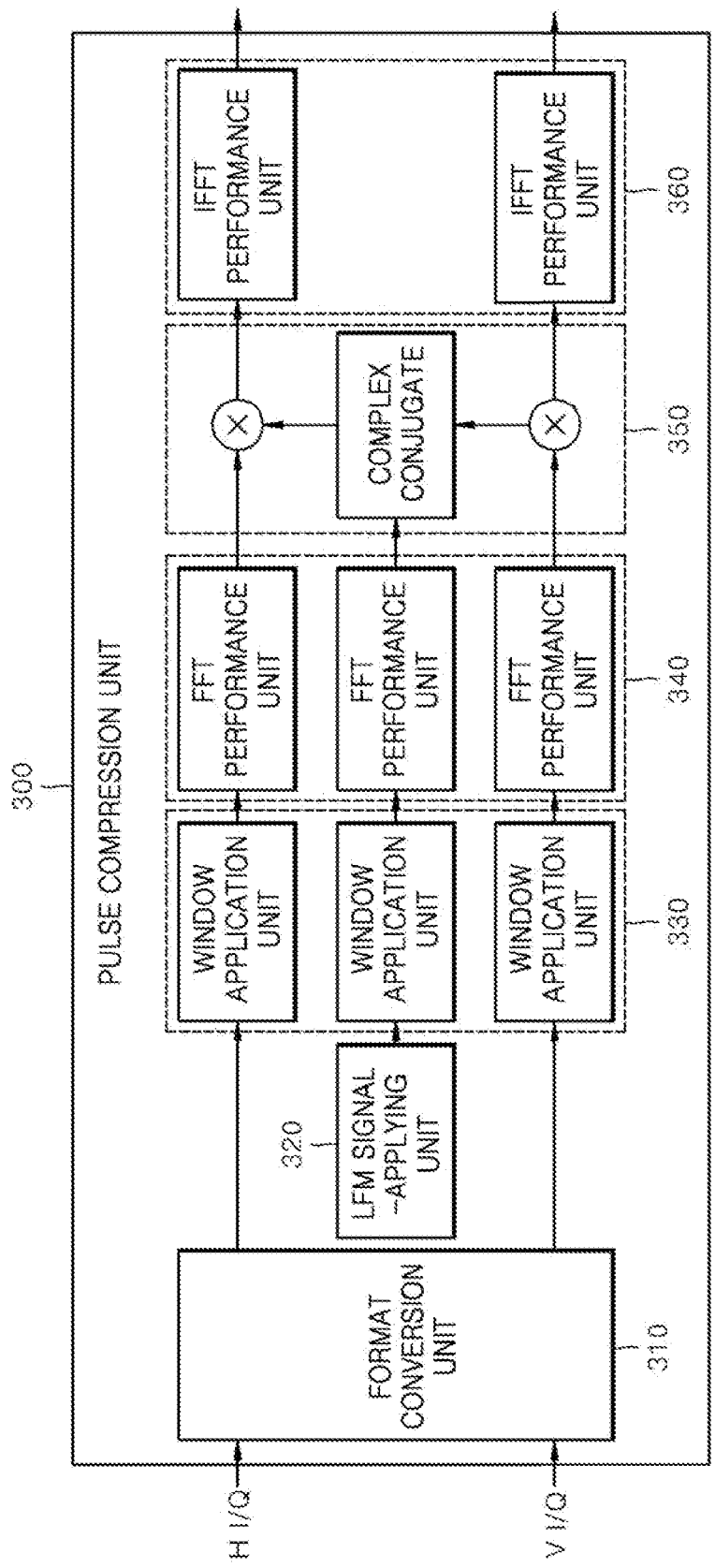
FIG. 3 is a block diagram of a pulse compression unit of FIG. 2 according to an embodiment of the present invention.

FIG. 3 is a block diagram of a pulse compression unit of FIG. 2 according to an embodiment of the present invention.

Referring to FIG. 3, a pulse compression unit 300 includes a format conversion unit 310, a linear frequency modulation (LFM) signal-applying unit 320, a window application unit 330, a fast fourier transform (FFT) performance unit 340, a convolution unit 350, and an inverse FFT (IFFT) performance unit 360.

The pulse compression unit 300 receives the horizontal/vertical (H/V) polarized wave I/Q signal including fixed decimal point data of 20 bits, and the format conversion unit 310 converts the received horizontal/vertical (H/V) polarized wave I/Q signal including fixed decimal point data of 20 bits into the format of a floating decimal point of 32 bits.

After that, the pulse compression unit 300 performs pulse compression. A pulse compression method includes a time domain method and a frequency domain method. The time domain method is a procedure for convoluting a received LFM (or chirp) signal and a reference LFM signal. In this case, since the amount of calculation is required in units of $N^2$ (N is the number of samples), when the number of samples is increased, the amount of calculation is exponentially increased. Thus, the frequency domain method using FFT is generally applied to pulse compression. In this case, the frequency domain method is mathematically the same as the time domain method. However, the amount of calculation is required in units of N log N, and as the number of samples is increased, the amount of calculation is greatly decreased compared to the time domain method. However, since FFT is used, the number of samples should correspond to a multiplier of 2. FIG. 3 relates to a pulse compression method using the frequency domain method.

The LFM signal-applying unit 320 applies the reference LFM signal to the window application unit 330. The window application unit 330 applies window functions to the applied reference LFM signal, the horizontal polarized wave I/Q signal, and the vertical polarized wave I/Q signal. Examples of window functions include a hamming function, a blackman function, and a Kaiser function. The window functions are not limited. When no window function is applied before FFT is performed, a large number of side lobes is generated in the pulse-compressed signal. In this case, the window function is applied before FFT is performed, so that the number of side lobes is greatly reduced. However, main lobes may be widened so that a proper window function should be applied according to circumstances.

Figure 4A:
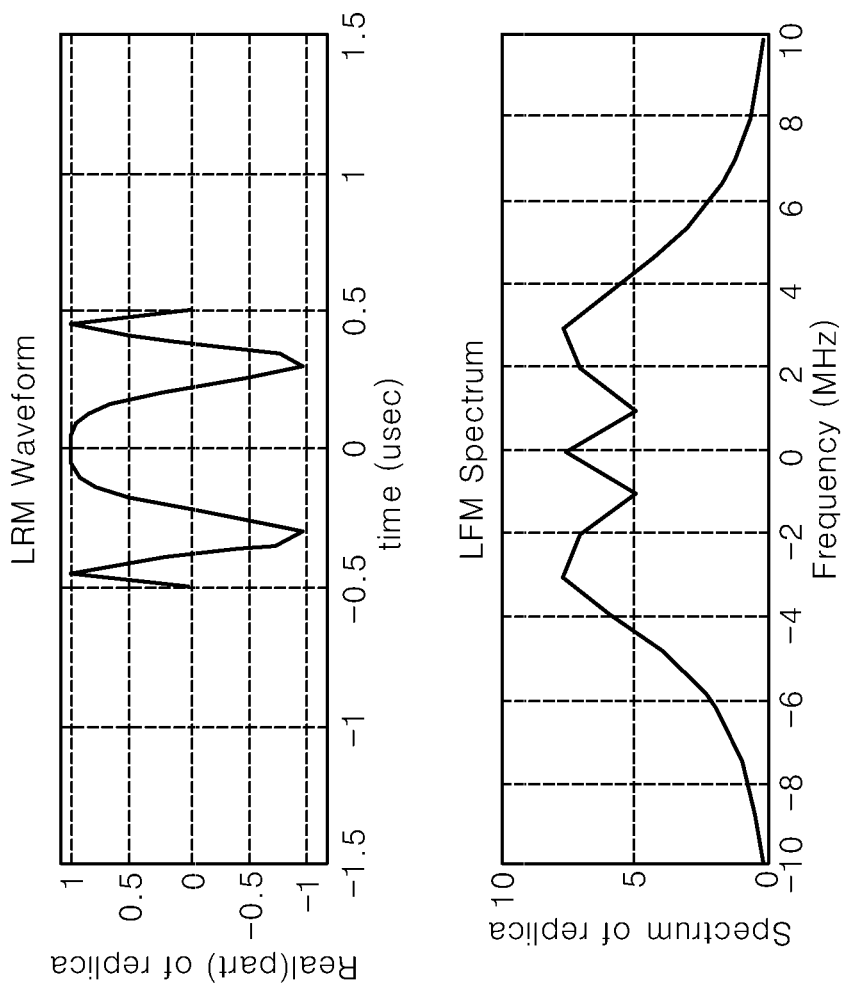
FIG. 4A is a view of a waveform of a reference linear frequency modulation (LFM) signal to which no window function is applied.
Figure 4B:
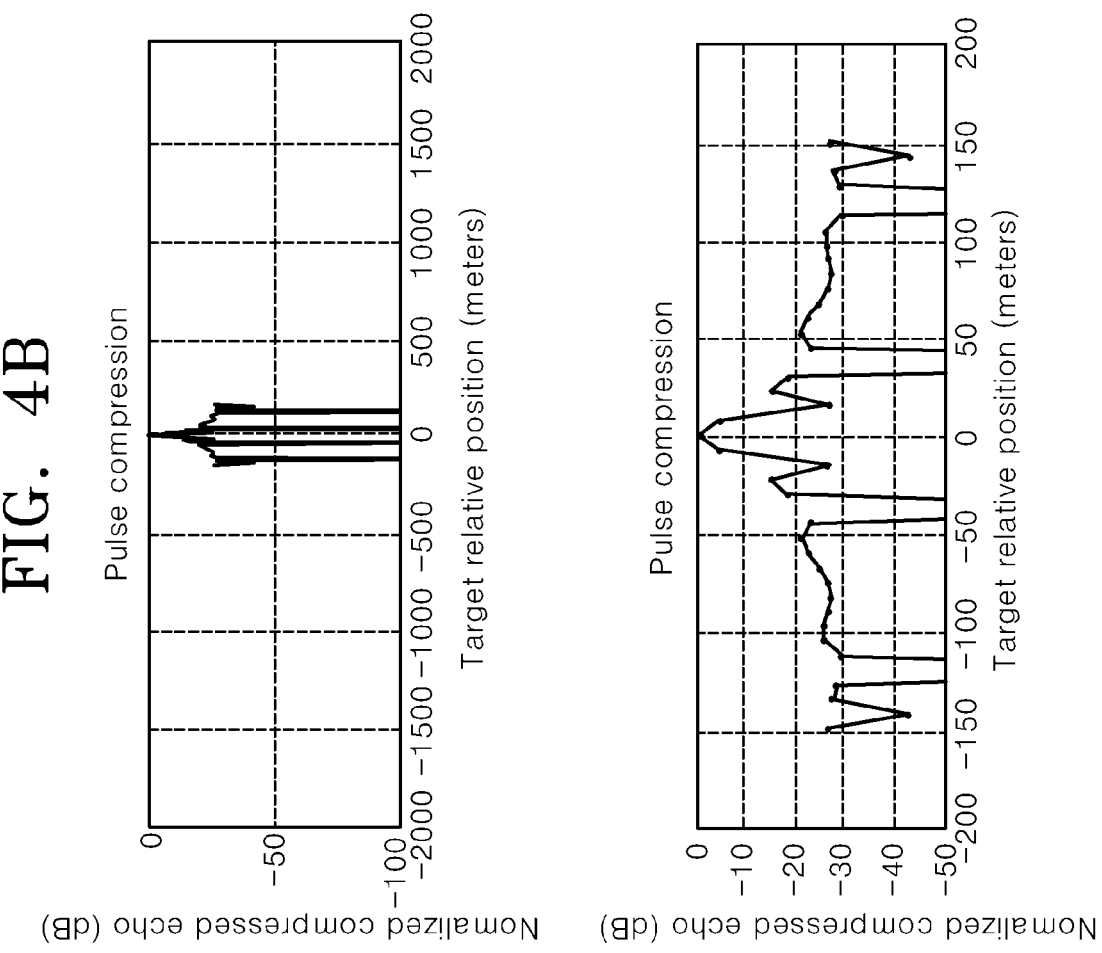
FIG. 4B is a view of a waveform of a pulse-compressed signal to which no window function is applied.

FIG. 4A is a view of a waveform of a reference LFM signal to which no window function is applied, and FIG. 4B is a view of a waveform of a pulse-compressed signal to which no window function is applied.

FIGS. 4A and 4B show the result of application in a near distance mode. A pulse width in the time domain is 1 [μs], and a bandwidth in the frequency domain is 10 [MHz]. As illustrated in FIG. 4B, a large number of side lobes is generated in a compressed signal.

Figure 5A:
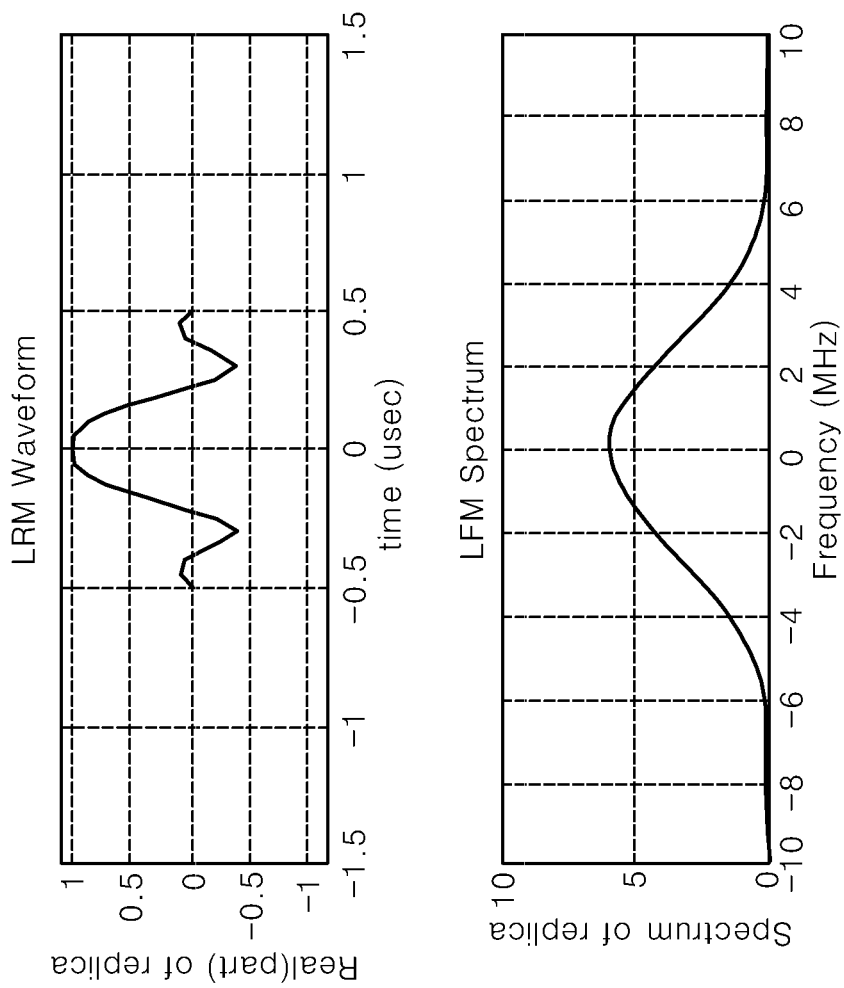
FIG. 5A is a view of a waveform of a reference LFM signal to which no window function is applied.
Figure 5B:
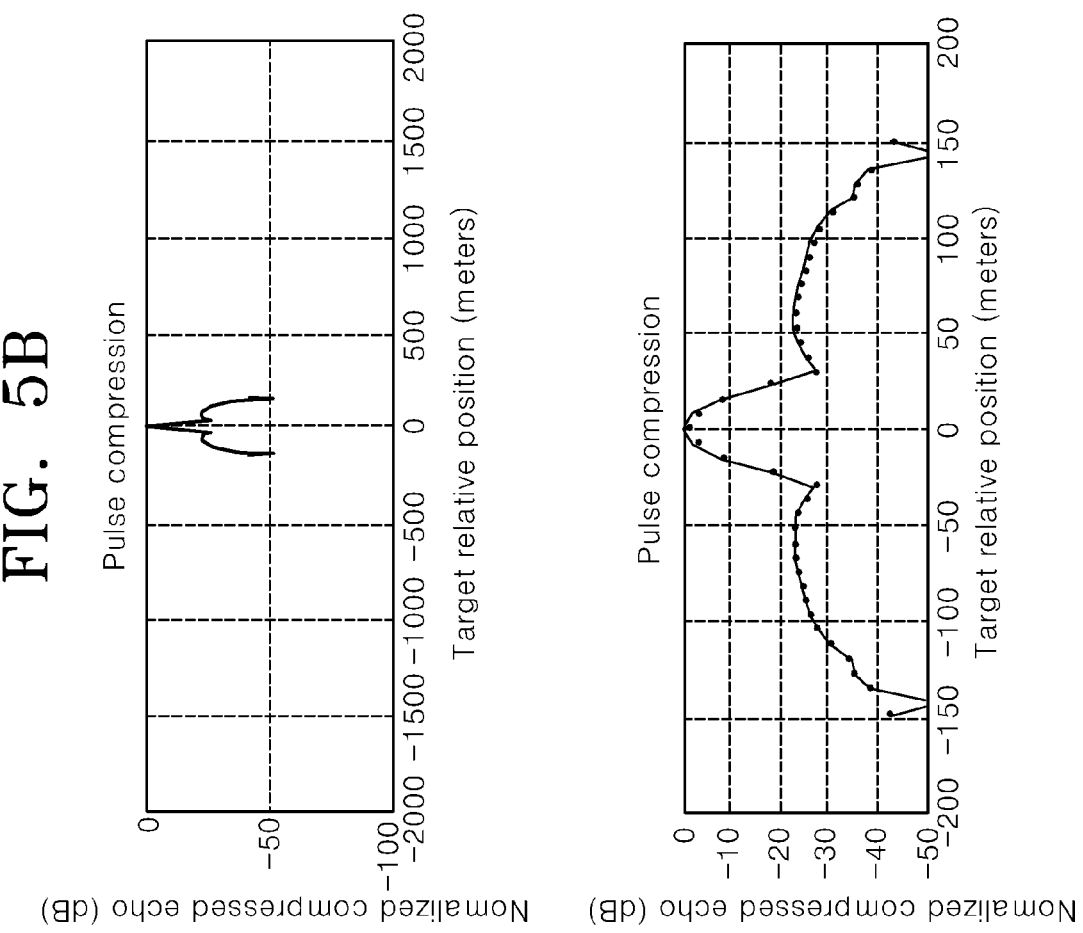
FIG. 5B is a view of a waveform of a pulse-compressed signal to which no window function is applied.

FIG. 5A is a view of a waveform of a reference LFM signal to which no window function is applied, and FIG. 5B is a view of a waveform of a pulse-compressed signal to which no window function is applied.

FIGS. 5A and 5B show the result of application in the near distance mode. FIGS. 5A and 5B show the result of applying a hamming function as a window function. A pulse width in the time domain is 1 [μs], and a bandwidth in the frequency domain is 10 [MHz]. As illustrated in FIG. 5B, the number of side lobes is reduced in a compressed signal.

The FFT performance unit 340 performs FFT on the reference LFM signal, the horizontal polarized wave I/Q signal, and the vertical polarized wave I/Q signal to which the window functions are applied. The convolution unit 350 convolutes the LFM signal and the horizontal polarized wave I/Q signal on which FFT is performed, and convolutes the LFM signal and the vertical polarized wave I/Q signal on which FFT is performed. After that, the IFFT performance unit performs IFFT on the convoluted signal, generates a compressed horizontal polarized wave complex pulse and a compressed vertical polarized wave complex pulse and transmits the generated compressed horizontal polarized wave complex pulse and a compressed vertical polarized wave complex pulse to the correlation coefficient calculation unit.

Figure 6:
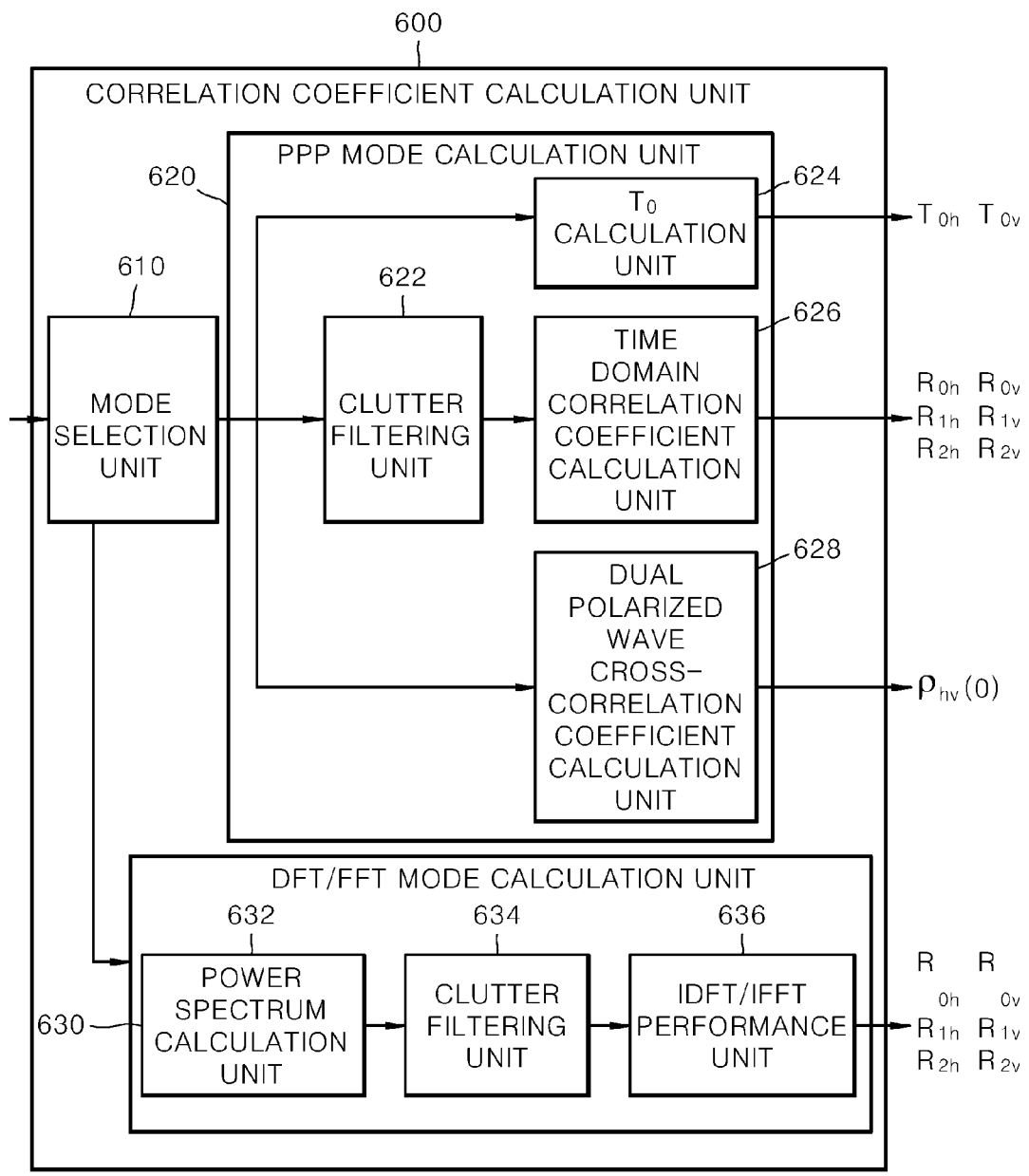
FIG. 6 is a block diagram of a correlation coefficient calculation unit of FIG. 2 according to an embodiment of the present invention.

FIG. 6 is a block diagram of the correlation coefficient calculation unit of FIG. 2 according to an embodiment of the present invention.

Referring to FIG. 6, the correlation coefficient calculation unit 600 includes a mode selection unit 610, a pulse pair processing (PPP) mode calculation unit 620, and a discret fourier transform/fast fourier transform (DFT/FFT) mode calculation unit 630. The PPP mode calculation unit 620 includes a clutter filtering unit 622, a $T_0$ calculation unit 624, a time domain correlation coefficient calculation unit 626, and a dual polarized wave cross-correlation coefficient calculation unit 628. The DFT/FFT mode calculation unit 630 includes a power spectrum calculation unit 632, a clutter filtering unit 634, and an IDFT/IFFT performance unit 636.

The correlation coefficient calculation unit 600 receives the compressed horizontal polarized wave complex pulse and the compressed vertical polarized wave complex pulse, calculates a correlation coefficient thereof and performs clutter filtering. Clutter filtering is applied to calculation of $R_0$, $R_1$, and $R_2$ that are single polarized wave correlation coefficients so that $R_0$, $R_1$, and $R_2$ are calculated. A procedure of obtaining the single polarized wave correlation coefficients is classified into a PPP mode that is a time domain calculation method and a DFT/FFT mode that is a frequency domain calculation method. The FFT mode is applied to reduce the amount of calculation when the number of pulses is a multiplier of 2 in a DFT mode. Time domain clutter filtering is applied to clutter filtering in the PPP mode, and frequency domain clutter filtering is applied to clutter filtering in the DFT/FFT mode. Time domain clutter filtering has a small amount of calculation and may be applied regardless of an operation mode and the type of a weather variable. However, when a clutter and weather data overlap each other, the clutter and the weather data cannot be distinguished from each other so that the weather data is damaged. An adaptive filtering technique may be applied to frequency domain clutter filtering. Thus, when the clutter and the weather data overlap each other, damage of the weather data is minimized. However, frequency domain clutter filtering has a large amount of calculation and may be applied only when a distance between pulses is uniform. Thus, frequency domain clutter filtering is not applied to calculate a partial dual polarized wave weather variable. In these days, due to the development of hardware performance, there is no problem in performing the frequency domain clutter filtering. Thus, only frequency domain clutter filtering is applied to single polarized wave calculation, and time domain clutter filtering is used to calculate a dual polarized wave correlation coefficient or when the distance between pulses is not uniform.

The mode selection unit 610 determines whether to calculate the correlation coefficient in the PPP mode or to calculate the correlation coefficient in the DFT/FFT mode so as to calculate $R_0$, $R_1$, and $R_2$ that are single polarized wave correlation coefficients.

When the PPP mode calculation unit 620 is selected, in order to calculate $R_0$, $R_1$, and $R_2$, the clutter filtering unit 622 performs clutter filtering on the received horizontal/vertical polarized wave complex pulse. An infinite impulse response (IIR) time domain clutter filter is used in the clutter filtering unit 622 in the PPP mode. A −40 dB filter or −50 dB filter is used as the IIR time domain clutter filter according to a clutter removing capability. These are selectively applied according to a clutter width.

Figure 7:
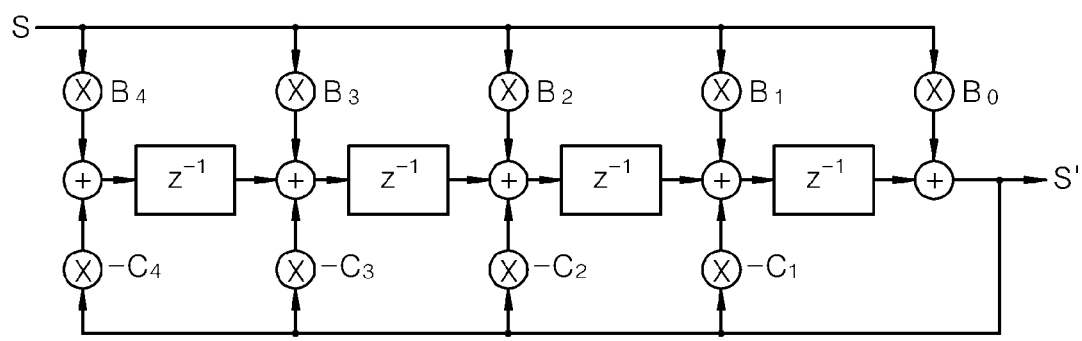
FIG. 7 is a view of a structure of an infinite impulse response (IIR) time domain clutter filter according to an embodiment of the present invention.

FIG. 7 is a view of a structure of an IIR time domain clutter filter according to an embodiment of the present invention.

Referring to FIG. 7, s is a received complex pulse, and s' is a filtered complex pulse. Here, $B_0$ to $B_4$ and $C_1$ to $C_4$ are filter coefficients. An equation for obtaining s' is as shown in the following Equation 1.

$$s'_n = B_0 s_n + B_1 s_{n-1} + B_2 s_{n-2} + B_3 s_{n-3} + B_4 s_{n-4} - C_1 s'_{n-1} + C_2 s'_{n-2} + C_3 s'_{n-3} + C_4 s'_{n-4} \qquad \text{[Equation 1]}$$

As known from characteristics of the IIR time domain clutter filter, the IIR time domain clutter filter suppresses all signals around zero-velocity to a predetermined size on an assumption that the velocity of a clutter is 0, so that a weather signal adjacent to the clutter is damaged.

The time domain correlation coefficient calculation unit 626 calculates $R_0$, $R_1$, and $R_2$ using the clutter-filtered horizontal/vertical polarized wave complex pulse. $R_0$ is a zero$^{th}$ lag autocorrelation of the filtered complex pulse, and $R_1$ is a first lag autocorrelation of the filtered complex pulse, and $R_2$ is a second lag autocorrelation of the filtered complex pulse.

Calculation equations of $R_0$, $R_1$, and $R_2$ are as shown in the following Equations 2, 3, and 4.

$$R_0 = \frac{1}{M} \sum_{n=1}^{M} s'^*_n s'_n \qquad \text{[Equation 2]}$$

$$R_1 = \frac{1}{M-1} \sum_{n=1}^{M-1} s'^*_n s'_{n+1} \qquad \text{[Equation 3]}$$

$$R_2 = \frac{1}{M-2} \sum_{n=1}^{M-2} s'^*_n s'_{n+2} \qquad \text{[Equation 4]}$$

In the case of $R_0$, $R_1$, and $R_2$, $R_{0h}$, $R_{1h}$, and $R_{2h}$ related to horizontal polarized wave and $R_{0v}$, $R_{1v}$, and $R_{2v}$ related to vertical polarized wave are calculated.

When the DFT/FFT mode calculation unit 630 is selected, the power spectrum calculation unit 632 calculates a power spectrum of each horizontal/vertical polarized wave in the frequency domain from the received complex pulse. A calculation equation for obtaining the power spectrum is as shown in the following Equation 5.

$$S_k = |DFT_k\{w_m s_m\}|^2 \quad \text{[Equation 5]}$$

$$= \left|\sum_{m=0}^{M} w_m s_m e^{-j\left(\frac{2\pi}{M}\right)mk}\right|^2$$

Since fourier transform is used in the frequency domain, the window function may be used to calculate the power spectrum so as to reduce the number of side lobes. In Equation 5, w is a window function.

The clutter filtering unit 634 obtains a power spectrum of each polarized wave component and then frequency domain clutter filters the power spectrum. The clutter filtering unit 634 distinguishes a spectrum of a clutter portion from the frequency domain, removes data of the clutter portion around zero velocity and then estimates weather data of the removed portion using an adjacent value. A method of restoring a weather signal of the removed portion includes linear interpolation and a Gaussian model adaptive processing (GMAP) method.

The IDFT/IFFT performance unit 636 performs IDFT/IFFT on the filtered power spectrum of each polarized wave component. In this case, first three coefficients of an IDFT/IFFTed coefficient, i.e., zero$^{th}$, first, and second coefficients are $R_{0h}$, $R_{0v}$, $R_{1h}$, $R_{1v}$, $R_{2h}$, and $R_{2v}$.

$T_0$ and a dual polarized wave cross-correlation coefficient $\rho_{hv}$ are calculated in the PPP mode.

The $T_0$ calculation unit 624 calculates $T_{0h}$ and $T_0$ from the horizontal/vertical polarized wave complex pulse. $T_0$ is a zero$^{th}$ lag autocorrelation of the unfiltered complex pulse, and $T_{0h}$ is horizontal polarized wave $T_0$, and $T_0$ is vertical polarized wave $T_0$. $T_0$ is calculated from each of horizontal polarized wave and vertical polarized wave, and a calculation equation thereof is as shown in the following Equation 6.

$$T_0 = \frac{1}{M}\sum_{n=1}^{M} s_n^* s_n \quad \text{[Equation 6]}$$

In Equation 6, M is the number of pulses, and s is a received complex pulse.

The dual polarized wave cross-correlation coefficient calculation unit 628 calculates the dual polarized wave cross-correlation coefficient $\rho_{hv}$ from the received complex pulse. $\rho_{hv}(0)$ is a zero$^{th}$ lag cross-correlation coefficient of an unfiltered vertical polarized wave complex pulse and horizontal polarized wave complex pulse. A calculation equation of $\rho_{hv}(0)$ is as shown in the following Equation 7.

$$\rho_{hv}(0) = \frac{\sum s_{vv} s_{hh}^*}{\sqrt{\sum s_{vv}^2 \sum s_{hh}^2}} \quad \text{[Equation 7]}$$

Clutter filtering is not basically performed on $\rho_{hv}(0)$, but clutter filtering may be selectively performed on $\rho_{hv}(0)$.

The correlation coefficient calculation unit 600 transmits the calculated correlation coefficients to a weather variable calculation unit.

Figure 8:
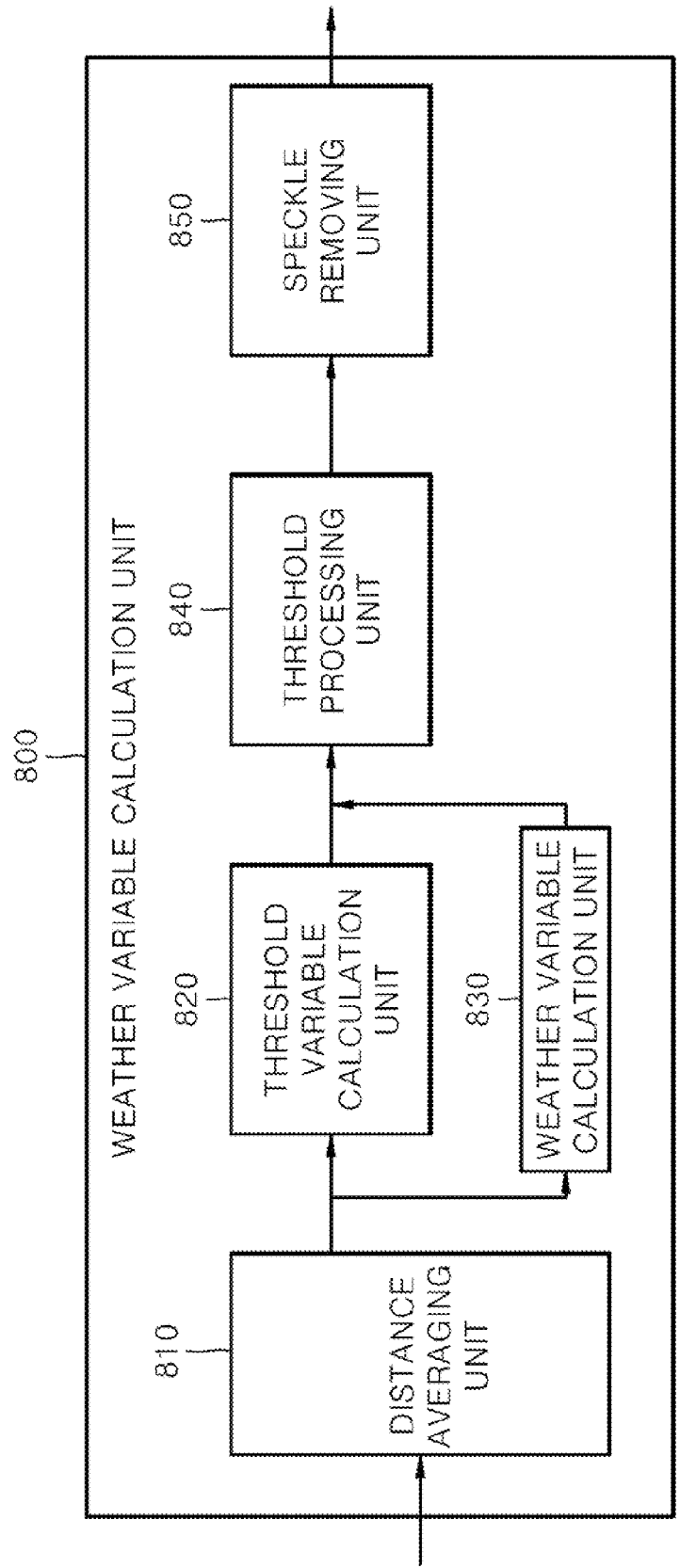
FIG. 8 is a block diagram of a weather variable calculation unit according to an embodiment of the present invention.

FIG. 8 is a block diagram of a weather variable calculation unit according to an embodiment of the present invention.

Referring to FIG. 8, a weather variable calculation unit 800 includes a distance averaging unit 810, a threshold variable calculation unit 820, a weather variable calculation unit 830, a threshold processing unit 840, and a speckle removing unit 850.

The distance averaging unit 810 actually averages a correlation coefficient that corresponds to n distances. Advantages of a distance averaging procedure include a reduction in the amount of calculation and suppressing noise and a local non-weather echo. However, since the n distances are averaged, distance resolution is lowered. The distance averaging procedure is a procedure that is selectively applied to a case where noise needs to be suppressed in a situation in which resolution is not significant. Thus, the distance averaging unit 810 is an element that is selectively applied.

The threshold variable calculation unit 820 calculates a threshold variable that is a variable for threshold processing. Types of the threshold variable include LOG, SQI, CCOR, and SIG. Equations for obtaining LOG, SQI, CCOR, and SIG are as shown in Equations 8 through 11.

$$LOG = 10\log\left[\frac{R_0}{N}\right] \quad \text{[Equation 8]}$$

$$SQI = \frac{|R_1|}{R_0} \quad \text{[Equation 9]}$$

$$CCOR = 10\log\frac{|R_1|\exp^{\frac{\pi^2 w^2}{2}}}{T_0 - R_0 + |R_1|\exp^{\frac{\pi^2 w^2}{2}}} \quad \text{[Equation 10]}$$

$$SIG = 10\log\left[\frac{2\pi S}{R_0 - 2\pi S}\right] \quad \text{[Equation 11]}$$

In Equation 8, N is noise power.

The weather variable calculation unit 830 calculates Z, V, W, and ZDR that are weather variables for each polarized wave using the received correlation coefficient and calculates ρHV, φDP, and KDP that are dual polarized wave cross-correlation weather variables.

Equations for obtaining Z, V, W, ZDR, ρHV, and φDP that are weather variables are as shown in the following Equations 12 through 17.

$$dBZ = 10\log\left[\frac{T_0 - N}{N}\right] + dBZ_0 + 20\log r + ar + CCOR \quad \text{[Equation 12]}$$

$$V = -\frac{\lambda}{4\pi \frac{1}{PRF}}\arg\{R_0\} \quad \text{[Equation 13]}$$

$$W = \frac{\sqrt{\frac{2}{3}\ln\left[\frac{|R_1|}{|R_2|}\right]}}{\pi} \quad \text{[Equation 14]}$$

$$ZDR = dBZh - dBZv + ZDR_{offset} \quad \text{[Equation 15]}$$

$$\rho HV = |\rho_{hv}(0)| \quad \text{[Equation 16]}$$

$$\phi DP = \arg[\rho_{hv}(0)] \quad \text{[Equation 17]}$$

In Equations 12 through 17, a is atmospheric attenuation, and r is a distance, and N is noise power. Also, values $dBZ_0$ and $ZDR_{offset}$ are received from the operation control unit.

A specific difference phase (KDP) among the weather variables is not directly calculated from the correlation coefficient but is secondarily calculated. The KDP is calculated using a variation amount (differential value) over time of φDP, as shown in Equation 18.

$$KDP = \frac{\phi DP(r_2) - \phi DP(r_1)}{2(r_2 - r_1)} \qquad \text{[Equation 18]}$$

Velocity V among the weather variables may be velocity unfolding processed. Velocity unfolding is a procedure of increasing the range of observation velocity by increasing the range of unambiguous velocity using dual PRF.

The threshold processing unit 840 removes weather variables less than a threshold value, i.e., causes only weather variables that exceed the threshold value to pass, so as to improve quality of the calculated weather variables.

Table 1 shows applied threshold variables caused by weather variables.

TABLE 1

| Weather variables | Applied threshold variables (AND/OR) |
|---|---|
| dBZ | LOG(\| SIG), CCOR |
| V | SQI, CCOR |
| W | SQI, CCOR, SIG |
| ZDR | LOG |
| Dual Pol | SQI, ρHV |

Table 2 shows an example of the range of a threshold value.

TABLE 2

| Threshold values | Ranges |
|---|---|
| $LOG_{thresh}$ | 0 to 40 dB |
| $SQI_{thresh}$ | 0 to 1 |
| $CCOR_{thresh}$ | 0 to −100 dB |
| $SIG_{thresh}$ | 0 to 100 dB |
| $\rho HV_{thresh}$ | 0 to 1 |

The applied threshold variables and the threshold value range are not limited to the above tables and are determined after signal quality analysis is performed using an external display analysis unit.

The speckle removing unit 850 interpolates or removes isolated data after threshold processing is performed, based on peripheral data so as to manage the quality of the weather variables. The speckle removing unit 850 examines n effectiveness of a neighbor value of isolated variables. If n or more peripheral data are effective, the data removed by the threshold processing is interpolated as peripheral effective values. If n or less peripheral data are effective, the data passed by the threshold processing is removed. The weather variables are finally calculated after speckles are removed.

Figure 9:
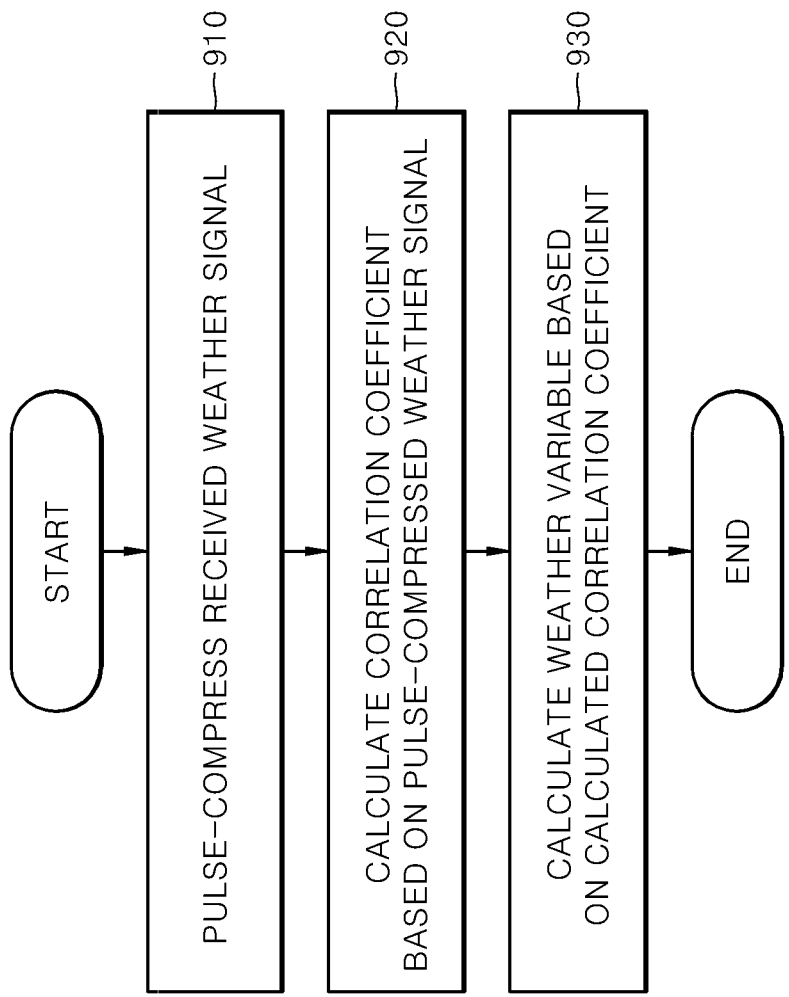
FIG. 9 is a flowchart illustrating a weather data signal processing method according to an embodiment of the present invention.

FIG. 9 is a flowchart illustrating a weather signal processing method according to an embodiment of the present invention.

Referring to FIG. 9, in Operation 910, the signal processing apparatus pulse-compresses a weather data signal received from radar. The signal processing apparatus receives a horizontal/vertical (H/V) polarized wave I/Q signal including fixed decimal point of 20 bits and converts the received horizontal/vertical (H/V) polarized wave I/Q signal into the format of a floating decimal point of 32 bits and then pulse-compresses the converted horizontal/vertical (H/V) polarized wave I/Q signal.

In Operation 920, the signal processing apparatus calculates a correlation coefficient based on the pulse-compressed weather signal. The signal processing apparatus calculates single polarized wave and dual polarized wave correlation coefficients from the compressed H/V polarized wave I/Q signal.

In Operation 930, the signal processing apparatus calculates a weather variable based on the calculated correlation coefficient. The signal processing apparatus calculates a threshold variable and the weather variable based on the correlation coefficient, threshold processes the calculated threshold variable and weather variable, removes speckles, thereby calculating a final weather variable.

Figure 10:
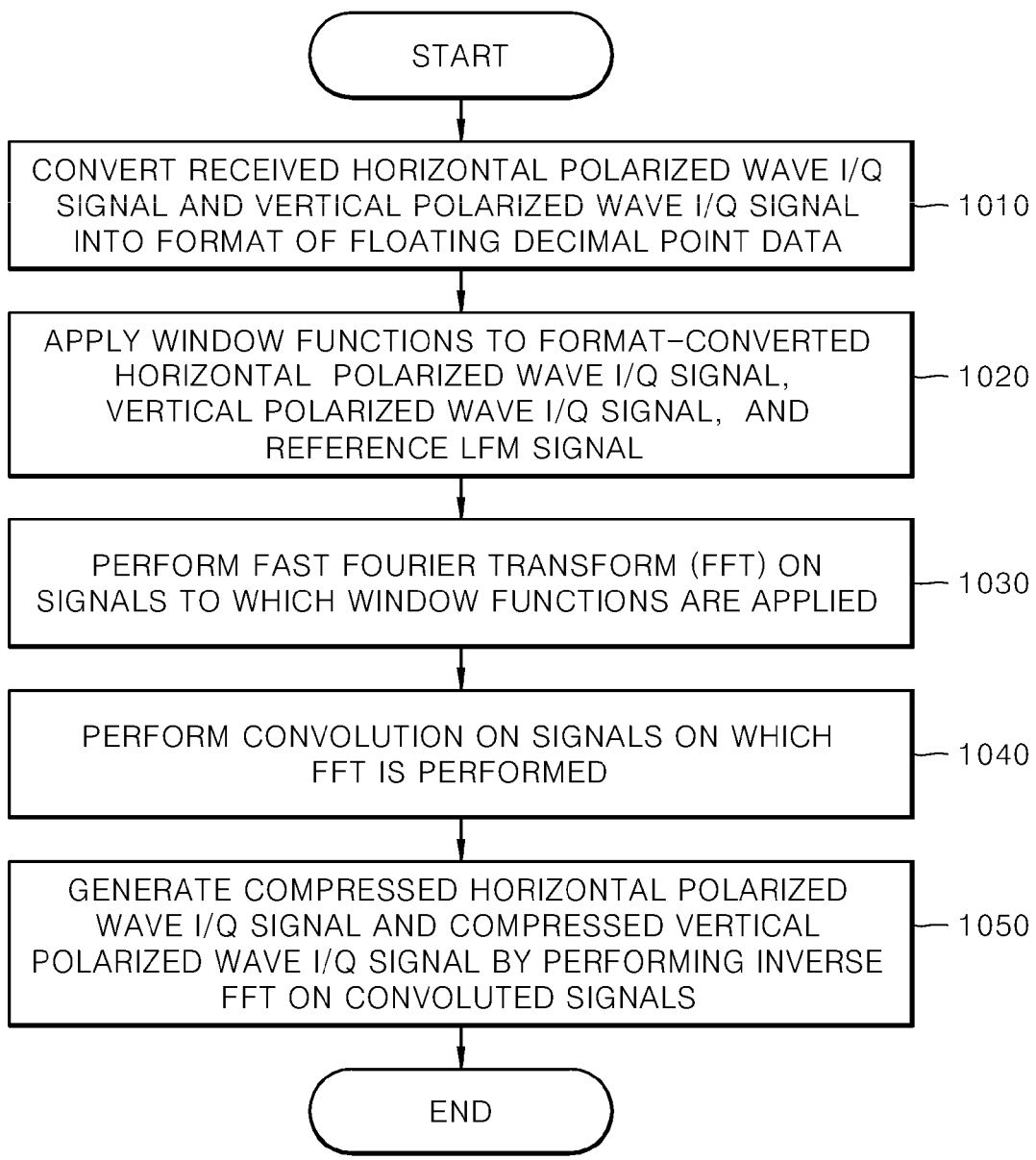
FIG. 10 is a flowchart illustrating a pulse compression operation 910 of FIG. 9 according to an embodiment of the present invention.

FIG. 10 is a flowchart illustrating a pulse compression operation 910 of FIG. 9 according to an embodiment of the present invention.

A pulse compression method includes a time domain method and a frequency domain method. The time domain method is a procedure of convoluting a received LFM (or chirp) signal and a reference LFM signal. In this case, since the amount of calculation is required in units of $N^2$ (N is the number of samples), when the number of samples is increased, the amount of calculation is exponentially increased. Thus, the frequency domain method using FFT is generally applied to pulse compression. In this case, the frequency domain method is mathematically the same as the time domain method. However, the amount of calculation is required in units of N log N, and as the number of samples is increased, the amount of calculation is greatly decreased compared to the time domain method. However, since FFT is used, the number of samples should correspond to a multiplier of 2. FIG. 10 relates to a pulse compression method using the frequency domain method.

Referring to FIG. 10, in Operation 1010, the signal processing apparatus converts a horizontal polarized wave I/Q signal and a vertical polarized wave I/Q signal of 20 bits that are received weather signals into floating decimal point data of 32 bits.

In Operation 1020, the signal processing apparatus applies a window function to the format-converted horizontal polarized wave I/Q signal and vertical polarized wave I/Q signal and the reference LFM signal. An example of the window function includes a hamming function, a blackman function, or a Kaiser function. The window function is not limited. When no window function is applied before FFT is performed, a large number of side lobes is generated in the pulse-compressed signal. In this case, the window function is applied before FFT is performed, so that the number of side lobes is greatly reduced. However, a main lobe may be widened so that a proper window function should be applied according to circumstances.

In Operation 1030, the signal processing apparatus performs FFT on the reference LFM signal, the horizontal polarized wave I/Q signal and the vertical polarized wave I/Q signal to which the window functions are applied.

In Operation 1040, the signal processing apparatus performs convolution on signals on which FFT is performed. The signal processing apparatus convolutes the FFTed LFM signal and horizontal polarized wave I/Q signal and convolutes the FFTed LFM signal and the vertical polarized wave I/Q signal.

In Operation 1050, the signal processing apparatus generates a compressed horizontal polarized wave I/Q signal and a compressed vertical polarized wave I/Q signal by performing IFFT on the convoluted signals.

Figure 11:
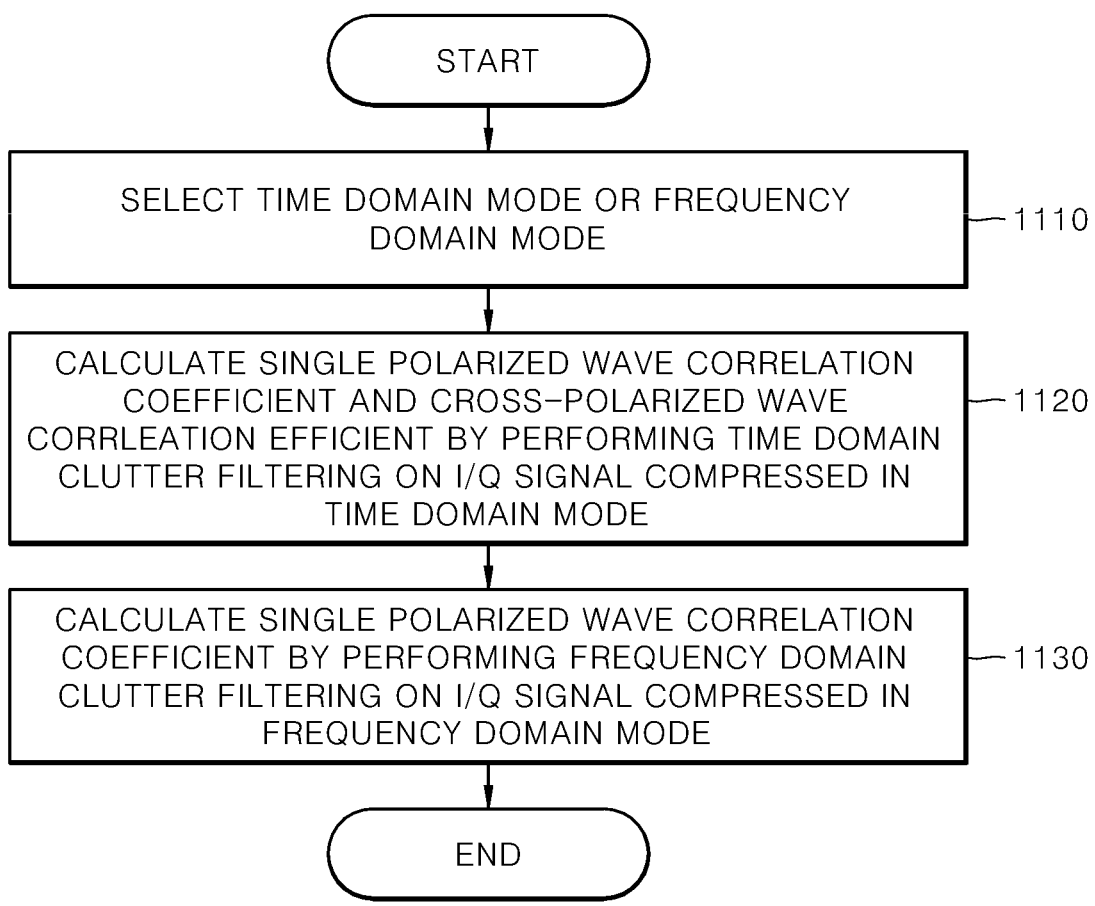
FIG. 11 is a flowchart illustrating a correlation coefficient calculation operation 920 of FIG. 9 according to an embodiment of the present invention.

FIG. 11 is a flowchart illustrating a correlation coefficient calculation operation 920 of FIG. 9 according to an embodiment of the present invention.

Referring to FIG. 11, in Operation 1110, the signal processing apparatus selects a time domain mode or a frequency domain mode. A procedure of obtaining a single polarized wave correlation coefficient is classified into a PPP mode that is a time domain calculation method and a DFT/FFT mode that is a frequency domain calculation method. The FFT mode is a method applied to reduce the amount of calculation when the number of pulses is a multiplier of 2 in a DFT mode. Time domain clutter filtering is applied to clutter filtering in the PPP mode, and frequency domain clutter filtering is applied to clutter filtering in the DFT/FFT mode. Time domain clutter filtering has a small amount of calculation and may be applied regardless of an operation mode and the type of the weather variable. However, when a clutter and weather data overlap each other, the clutter and the weather data cannot be distinguished from each other so that weather data is damaged. An adaptive filtering technique may be applied to frequency domain clutter filtering. Thus, when the clutter and the weather data overlap each other, damage of the weather data is minimized. However, frequency domain clutter filtering has a large amount of calculation and may be applied only when a distance between pulses is uniform. Thus, frequency domain clutter filtering is not applied to calculate a partial dual polarized wave weather variable. In these days, due to the development of hardware performance, there is no problem in performing the frequency domain clutter filtering. Thus, only frequency domain clutter filtering is applied to single polarized wave calculation, and time domain clutter filtering is used to calculate a dual polarized wave correlation coefficient or when the distance between pulses is not uniform. The signal processing apparatus determines whether to calculate the correlation coefficient in the PPP mode or to calculate the correlation coefficient in the DFT/FFT mode so as to calculate $R_0$, $R_1$, and $R_2$ that are single polarized wave correlation coefficients.

In Operation 1120, the signal processing apparatus performs time domain clutter filtering on the compressed I/Q signal in the time domain mode and calculates a single polarized wave correlation coefficient and a cross-polarized wave correlation coefficient. The signal processing apparatus performs clutter filtering on received horizontal/vertical polarized wave complex pulse so as to calculate $R_0$, $R_1$, and $R_2$. An IIR time domain clutter filter is used as a clutter filter in the time domain mode. A −40 dB filter or −50 dB filter is used as the IIR time domain clutter filter according to a clutter removing capability. These are selectively applied according to a clutter width. An example of the IIR time domain clutter filter is previously shown in FIG. 7. As known from characteristics of the IIR time domain clutter filter, the IIR time domain clutter filter suppresses all signals around zero-velocity to a predetermined size on an assumption that the velocity of a clutter is 0, so that a weather signal adjacent to the clutter is damaged. The signal processing apparatus calculates $R_0$, $R_1$, and $R_2$ using the clutter-filtered horizontal/vertical polarized wave complex pulse. $R_0$ is a zero$^{th}$ lag autocorrelation of the filtered complex pulse, and $R_1$ is a first lag autocorrelation of the filtered complex pulse, and $R_2$ is a second lag autocorrelation of the filtered complex pulse. Calculation equations of $R_0$, $R_1$, and $R_2$ are as shown in the following Equations 2, 3, and 4. In the case of $R_0$, $R_1$, and $R_2$, $R_{0h}$, $R_{1h}$, and $R_{2h}$ related to horizontal polarized wave and $R_{0v}$, $R_{1v}$, and $R_{2v}$ related to vertical polarized wave are calculated.

$T_0$ and a dual polarized wave cross-correlation coefficient $\rho_{hv}$ are calculated in the time domain mode. The signal processing apparatus calculates $T_{0h}$ and $T_{0v}$ from the horizontal/vertical polarized wave complex pulse. $T_0$ is a zero$^{th}$ lag autocorrelation of the unfiltered complex pulse, and $T_{0h}$ is horizontal polarized wave $T_0$, and $T_{0v}$ is vertical polarized wave $T_0$. $T_0$ is calculated from each of horizontal polarized wave and vertical polarized wave, and a calculation equation thereof is as shown in the following Equation 6. The dual polarized wave cross-correlation coefficient $\rho_{hv}$ is calculated from the received complex pulse. $\rho_{hv}(0)$ is a zero$^{th}$ lag cross-correlation coefficient of an unfiltered vertical polarized wave complex pulse and horizontal polarized wave complex pulse. A calculation equation of $\rho_{hv}(0)$ is as shown in the following Equation 7. Clutter filtering is not basically performed on $\rho_{hv}(0)$, but clutter filtering may be selectively performed on $\rho_{hv}(0)$.

In Operation 1130, the signal processing apparatus performs frequency domain clutter filtering on the compressed I/Q signal in the frequency domain mode and calculates a single polarized wave correlation coefficient. When the frequency domain mode, i.e., the DFT/FFT mode is selected, the signal processing apparatus calculates a power spectrum of each horizontal/vertical polarized wave in the frequency domain from the received complex pulse. A calculation equation for obtaining the power spectrum is as shown in the following Equation 5. Since fourier transform is used in the frequency domain, the window function may be used to calculate the power spectrum so as to reduce the number of side lobes. After that, the signal processing apparatus obtains a power spectrum of each polarized wave component and then frequency domain clutter filters the power spectrum. The signal processing apparatus distinguishes a spectrum of a clutter portion from the frequency domain, removes data of the clutter portion around zero velocity and then estimates weather data of the removed portion using an adjacent value. A method of restoring a weather signal of the removed portion includes linear interpolation and a Gaussian model adaptive processing (GMAP) method. After that, the signal processing apparatus performs IDFT/IFFT on the filtered power spectrum of each polarized wave component. In this case, first three coefficients of an IDFT/IFFTed coefficient, i.e., zero$^{th}$, first, and second coefficients are $R_{0h}$, $R_{0v}$, $R_{1h}$, $R_{1v}$, $R_{2h}$, and $R_{2v}$.

Figure 12:
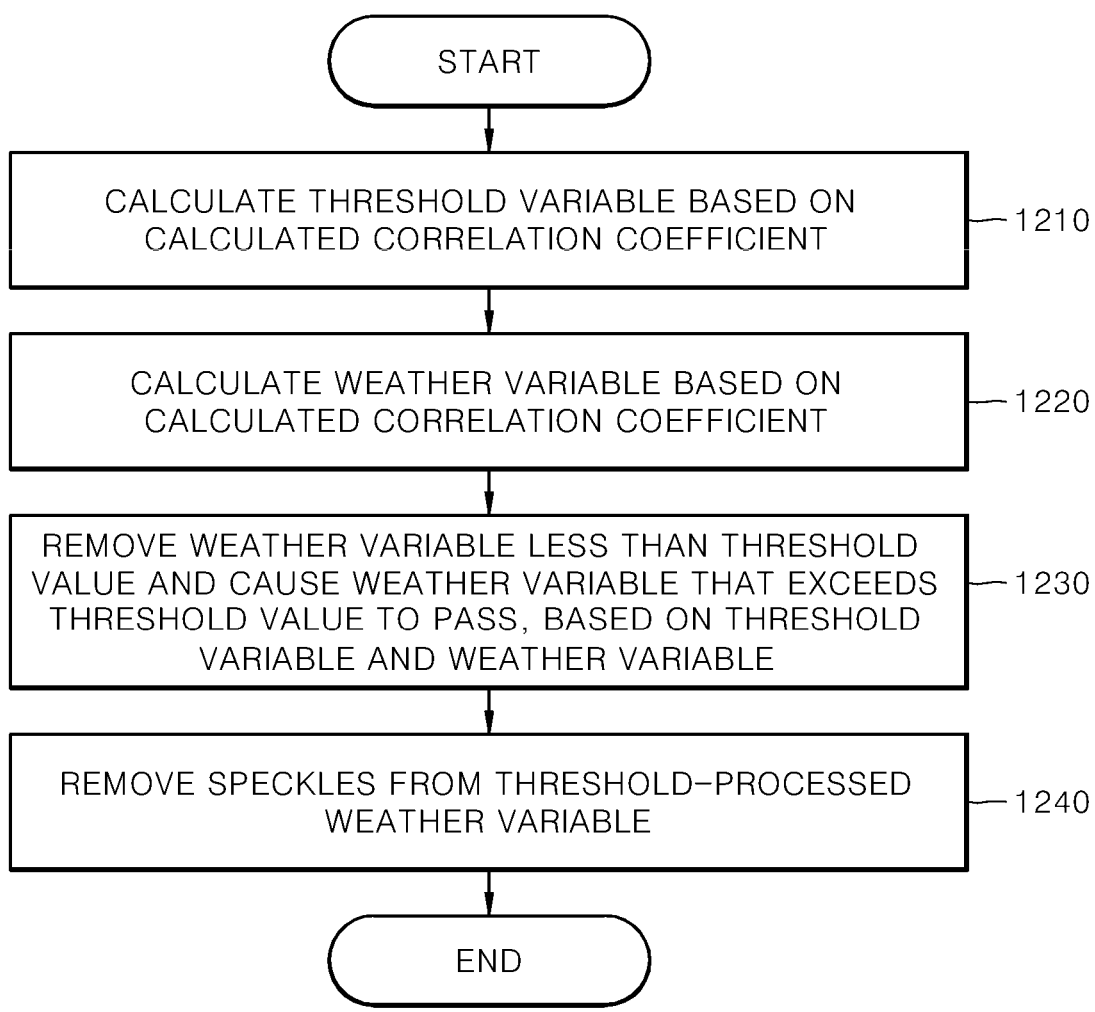
FIG. 12 is a flowchart illustrating a weather variable calculation operation 930 of FIG. 9 according to an embodiment of the present invention.

FIG. 12 is a flowchart illustrating a weather variable calculation operation 930 of FIG. 9 according to an embodiment of the present invention.

Referring to FIG. 12, in Operation 1210, the signal processing apparatus calculates a threshold variable based on the calculated correlation coefficient. Types of the threshold variable include LOG, SQI, CCOR, and SIG. Equations for obtaining LOG, SQI, CCOR, and SIG are as shown in Equations 8 through 11.

In Operation 1220, the signal processing apparatus calculates weather variables based on the calculated correlation coefficient. The signal processing apparatus calculates Z, V, W, and ZDR that are weather variables for each polarized wave using the received correlation coefficient and calculates ρHV, ϕDP, and KDP that are dual polarized wave cross-correlation weather variables. Equations for obtaining Z, V, W, ZDR, ρHV, and ϕDP that are weather variables are as shown in the following Equations 12 through 17. A KDP among the weather variables is not directly calculated from the correlation coefficient but is secondarily calculated. The KDP is calculated using a variation amount (differential value) over time of ϕDP, as shown in Equation 18. Also, velocity V among the weather variables may be velocity unfolding processed. Velocity unfolding is a procedure of increasing the range of observation velocity by increasing the range of unambiguous velocity using dual PRF.

In Operation 1230, the signal processing apparatus removes weather variables less than a threshold value, i.e., causes only weather variables that exceed the threshold value to pass, based on the threshold variable and the weather variable.

In Operation 1240, the signal processing apparatus removes speckles from the threshold-processed weather variable. The signal processing apparatus interpolates or removes isolated data after threshold processing is performed, based on peripheral data so as to manage the quality of the weather variables. In detail, the signal processing apparatus examines n effectiveness of a neighbor value of isolated variables. If n or more peripheral data are effective, the data removed by the threshold processing is interpolated as peripheral effective values. If n or less peripheral data are effective, the data passed by the threshold processing is removed. The weather variables are finally calculated after speckles are removed.

Although not shown, prior to Operation 1210 of FIG. 12, the signal processing apparatus may average a distance of the calculated correlation coefficient. Advantages of a distance averaging procedure include a reduction in the amount of calculation and suppressing noise and a local non-weather echo. However, since distances are averaged, distance resolution is lowered. The distance averaging procedure is a procedure that is selectively applied to a case where noise needs to be suppressed in a situation in which resolution is not significant.

As described above, a weather data signal processing method according to the invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

According to the present invention, a radar weather data signal processing method and signal processing module, whereby high resolution can be implemented and a window function is applied to pulse compression so that a problem of the occurrence of side lobes can be solved, can be configured.

The invention claimed is:

1. A radar weather data signal processing module comprising:
   a pulse compression unit that pulse-compresses a received weather signal;
   a correlation coefficient calculation unit that calculates a correlation coefficient based on the pulse-compressed weather signal; and
   a weather variable calculation unit that calculates a weather variable based on the calculated correlation coefficient,
   wherein the pulse compression unit comprises:
   a format conversion unit that converts a horizontal polarized wave in-phase/quadrature-phase (I/Q) signal and a vertical polarized wave I/Q signal that are received weather signals, into a format of floating decimal point data;
   a linear frequency modulation (LFM) signal-applying unit that applies a reference LFM signal;
   a window application unit that applies window functions to the horizontal polarized wave I/Q signal and the vertical polarized wave I/Q signal that are converted by the format conversion unit and the reference LFM signal;
   a fast fourier transform (FFT) performance unit that performs FFT on the signals to which the window functions are applied;
   a convolution unit that performs convolution on the signals on which FFT is performed by the FFT performance unit; and
   an inverse FFT (IFFT) performance unit that generates a compressed horizontal polarized wave I/Q signal and a compressed vertical polarized wave I/Q signal by performing IFFT on the convoluted signals.

2. The radar weather data signal processing module of claim 1, wherein the correlation coefficient calculation unit comprises:
   a mode selection unit that selects a time domain mode or a frequency domain mode;
   a time domain mode unit that calculates a single polarized wave correlation coefficient and a cross-polarized wave correlation coefficient by performing time domain clutter filtering on the compressed I/Q signal; and
   a frequency domain mode unit that calculates a single polarized wave correlation coefficient by performing frequency domain clutter filtering on the compressed I/Q signal.

3. The radar weather data signal processing module of claim 1, wherein the weather variable calculation unit comprises:
   a threshold variable calculation unit that calculates a threshold variable based on the calculated correlation coefficient;
   a weather variable calculation unit that calculates a weather variable based on the calculated correlation coefficient;
   a threshold processing unit that removes a weather variable less than a threshold value and causes a weather variable that exceeds the threshold value to pass, based on the threshold variable and the weather variable; and
   a speckle removing unit that removes speckles from the weather variable that is threshold-processed by the threshold processing unit.

4. The radar weather data signal processing module of claim 3, wherein the weather variable calculation unit further comprises a distance averaging unit that averages a distance of the calculated correlation coefficient.

5. A radar weather data signal processing method, whereby a weather signal is processed by a radar weather data signal processing module, the radar weather data signal processing method comprising:

pulse-compressing a received weather signal using the radar weather data signal processing module;
calculating a correlation coefficient based on the pulse-compressed weather signal using the radar weather data signal processing module; and
calculating a weather variable based on the calculated correlation coefficient using the radar weather data signal processing module,
wherein the pulse-compressing comprises:
a format conversion operation of converting a horizontal polarized wave I/Q signal and a vertical polarized wave I/Q signal that are received weather signals, into a format of floating decimal point data using the radar weather data signal processing module;
applying window functions to the format-converted horizontal polarized wave I/Q signal and the vertical polarized wave I/Q signal and the reference LFM signal using the radar weather data signal processing module;
performing FFT on the signals to which the window functions are applied, using the radar weather data signal processing module;
performing convolution on the signals on which FFT is performed by the FFT performance unit using the radar weather data signal processing module; and
generating a compressed horizontal polarized wave I/Q signal and a compressed vertical polarized wave I/Q signal by performing IFFT on the convoluted signals using the radar weather data signal processing module.

6. The radar weather data signal processing method of claim 5, wherein the calculating of the correlation coefficient comprises:
selecting a time domain mode or a frequency domain mode using the radar weather data signal processing module;
calculating a single polarized wave correlation coefficient and a cross-polarized wave correlation coefficient by performing time domain clutter filtering on the compressed I/Q signal using the radar weather data signal processing module; and
calculating a single polarized wave correlation coefficient by performing frequency domain clutter filtering on the compressed I/Q signal using the radar weather data signal processing module.

7. The radar weather data signal processing method of claim 5, wherein the calculating of the weather variable comprises:
calculating a threshold variable based on the calculated correlation coefficient using the radar weather data signal processing module;
calculating a weather variable based on the calculated correlation coefficient using the radar weather data signal processing module;
removing a weather variable less than a threshold value and causing a weather variable that exceeds the threshold value to pass, based on the threshold variable and the weather variable using the radar weather data signal processing module; and
removing speckles from the weather variable that is threshold-processed by the threshold processing unit using the radar weather data signal processing module.

8. The radar weather data signal processing method of claim 7, wherein the calculating of the weather variable further comprises averaging a distance of the calculated correlation coefficient using the radar weather data signal processing module.

* * * * *